United States Patent [19]

Tomko et al.

[11] Patent Number: 5,712,912
[45] Date of Patent: Jan. 27, 1998

[54] METHOD AND APPARATUS FOR SECURELY HANDLING A PERSONAL IDENTIFICATION NUMBER OR CRYPTOGRAPHIC KEY USING BIOMETRIC TECHNIQUES

[75] Inventors: George J. Tomko, East York; Alexei Stoianov, Toronto, both of Canada

[73] Assignee: Mytec Technologies Inc., Don Mills, Canada

[21] Appl. No.: 508,978

[22] Filed: Jul. 28, 1995

[51] Int. Cl.$^6$ .................................................. H04L 9/32
[52] U.S. Cl. .................................................. 380/23; 380/44
[58] Field of Search ................................... 380/44, 23

[56] References Cited

U.S. PATENT DOCUMENTS

| | | |
|---|---|---|
| 3,716,301 | 2/1973 | Caulfield et al. |
| 3,771,129 | 11/1973 | McMahon ............... 340/146.3 E |
| 4,532,508 | 7/1985 | Ruell ............................. 382/4 |
| 4,837,843 | 6/1989 | Owechko ....................... 382/31 |
| 4,876,725 | 10/1989 | Tomko . |
| 4,993,068 | 2/1991 | Piosenka et al. ............... 380/23 |
| 5,040,140 | 8/1991 | Horner ........................ 364/822 |
| 5,050,220 | 9/1991 | Marsh et al. . |
| 5,095,194 | 3/1992 | Barbanell . |
| 5,138,468 | 8/1992 | Barbanell . |
| 5,148,157 | 9/1992 | Florence . |
| 5,150,229 | 9/1992 | Takesue et al. ................ 359/7 |
| 5,159,474 | 10/1992 | Franke et al. ................ 359/29 |
| 5,245,329 | 9/1993 | Gokcebay ................ 340/825.31 |
| 5,268,963 | 12/1993 | Monroe et al. ............... 380/23 |
| 5,280,527 | 1/1994 | Gullman et al. ............... 380/23 |
| 5,327,286 | 7/1994 | Sampsell et al. ............. 359/561 |
| 5,343,415 | 8/1994 | Itoh et al. .................... 364/725 |
| 5,345,508 | 9/1994 | Lynn et al. . |
| 5,347,375 | 9/1994 | Saito et al. .................... 359/9 |
| 5,386,378 | 1/1995 | Itoh et al. .................... 364/822 |
| 5,418,380 | 5/1995 | Simon et al. ................ 250/550 |
| 5,428,683 | 6/1995 | Indeck et al. ................. 380/4 |
| 5,469,506 | 11/1995 | Berson et al. ................. 380/23 |
| 5,541,994 | 7/1996 | Tomko et al. . |

FOREIGN PATENT DOCUMENTS

| | | | |
|---|---|---|---|
| 0 396 774 | 11/1990 | European Pat. Off. | ......... G06F 3/06 |
| 2 360 079 | 10/1985 | Germany | ............. G09C 1/00 |
| 4243908 | 6/1994 | Germany . | |
| 2 132 857 | 7/1984 | United Kingdom | ......... H04K 1/00 |

OTHER PUBLICATIONS

"Novel Applications of Cryptography in Digital Communications", Jim K. Omura, IEEE Communications Magazine, vol. 28, 1990, pp. 21–29.

"Optical Image Encryption Using Input Plane and Fourier Plane Random Encoding", Philippe Refregier and Bahram Javidi, SPIE vol.2565(1995), pp. 62–68.

*Primary Examiner*—Gilberto Barrón, Jr.
*Attorney, Agent, or Firm*—Marshall, O'Toole, Gerstein, Murray & Borun

[57] ABSTRACT

A method and apparatus using biometric information (such as a fingerprint, an iris structure, etc.) as a cipher for encrypting and decrypting a personal identification number (PIN) which is used as an input to a PIN requiring device. The method of encryption of a PIN includes generating a sequence of random characters representing a PIN to be encrypted; obtaining a generating function such that the random characters are coefficients in an expansion of a square of said generating function over basis functions; and dividing a transform of the generating function by Fourier transformed information image signal to obtain the encrypted PIN. The latter is stored digitally or as a hologram in a personal card or a database. To decrypt the PIN, a full-complex spatial light modulator is illuminated with an optical beam carrying the Fourier transform of the biometric image of an individual to be identified. The encrypted PIN may be also stored in a reflective hologram which is non-destructively attached to a personal card, and the decryption of a PIN comprises illuminating the hologram with the beam carrying the Fourier transform of the biometric image. In other embodiments of the invention, a cipher may be derived from an intensity distribution (captured directly by a camera) of the Fourier spectrum of the biometric image. The PIN may be encrypted and decrypted either optically (with phase conjugation techniques) or digitally (using an encryption algorithm).

31 Claims, 9 Drawing Sheets

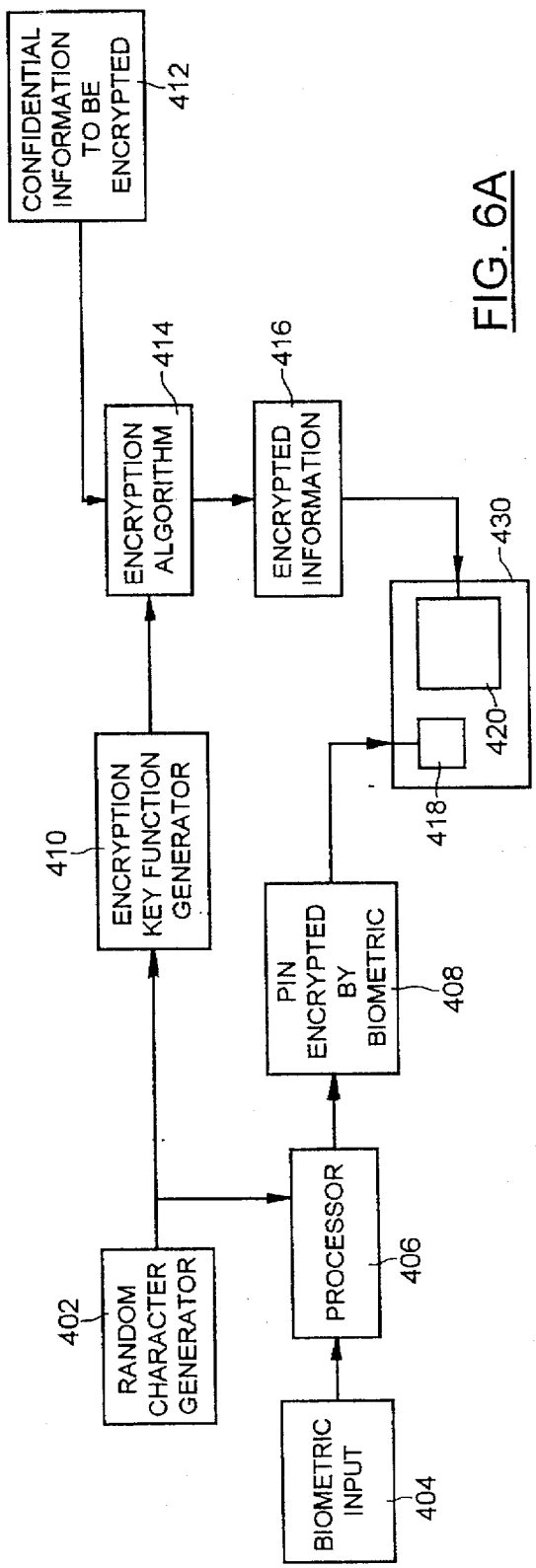
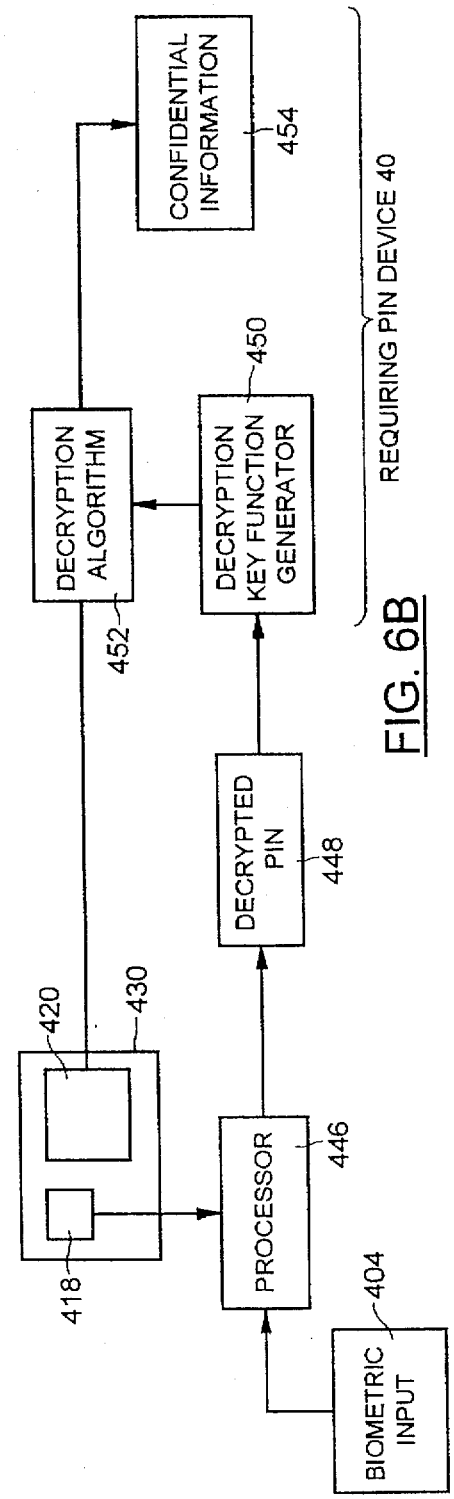
FIG. 6A
FIG. 6B

METHOD AND APPARATUS FOR SECURELY HANDLING A PERSONAL IDENTIFICATION NUMBER OR CRYPTOGRAPHIC KEY USING BIOMETRIC TECHNIQUES

FIELD OF THE INVENTION

This invention relates to a method for securely storing a personal identification number (PIN) or cryptographic key and a method for later recovering the PIN (or key) as well as apparatus to carry out these methods.

BACKGROUND OF THE INVENTION

The security of communications, data storage and access, use of credit and other types of transaction cards depends on a proper use of personal identification numbers. The problem is that the PIN does not confirm identity. Furthermore, to the extent it does provide security, it has to either be memorized (which is impractical in case of a PIN with many-digit numbers) or stored in a secure place, which in turn can be compromised.

Alternatively, a positive identification of an individual prior to allowing a transaction could be performed by various biometric techniques such as fingerprint or iris verification, some of them having been described in the prior art. A biometric can be any physiological characteristic containing information which is unique for each individual. The biometric techniques compare the information related to the individual's unique characteristic with a pre-recorded template, and, if the result of the comparison is positive, the individual is allowed access to the system, e.g. use of an automatic banking machine. The pre-recorded template of the individual's biometric can be stored either on a portable storage means such as a smart card or in a centralized database and accessed for comparison by a nonconfidential biometric identification number (BID). Obvious advantages of the biometric techniques are that, first, a person does not have to memorize a PIN; second, even if a person's card is lost or stolen or his BID number is discovered, this will not affect the security of the system.

However, biometric techniques have one essential drawback which has not attracted proper attention so far: an output of a biometric verification "black box" is usually a simple electrical signal like "true" or "false". If such a "black box" were connected with an existing transaction or security system, an imposter could simulate a positive verification by sending an appropriate signal ("true") to the system. Moreover, the infrastructure of many finance, commerce and security systems are based on receiving a unique PIN from the user, and modifying such systems to incorporate biometric verification in lieu of PINs would cause additional expense. Accordingly, many systems requiring secure access will still require a PIN even in case of positive biometric verification of an individual.

SUMMARY OF THE INVENTION

This invention seeks to overcome some drawbacks of the prior art and to expand the area of using biometric techniques. It is an object of the present invention to provide a method and apparatus which utilize biometric techniques to generate a PIN which does not have to be remembered or even known by an individual.

The PIN generating apparatus consists of an encrypting device and a PIN decrypting device. The generation of a PIN means that a sequence of random characters representing a PIN and obtained, for example, from a random character generator, is encrypted with biometric information from an individual and stored in storage means (such as a personal card or a database). To get access to a system which requires a PIN, the individual places his personal card, for example, into a reading device which retrieves the encrypted PIN. A biometric reading apparatus obtains an information signal modulated with the biometric characteristic of the individual which then deciphers the PIN, said biometric information being a key to the encrypted PIN. The decrypted PIN is sent to a system which uses the PIN to access information or provide a service.

The first embodiment of the invention comprises obtaining a digital image of a biometric and deriving a two-dimensional Fourier transformed image from said digital image; obtaining a generating function such that the random characters representing the PIN to be encrypted are coefficients in an expansion of a square of said generating function over a set of basis functions; obtaining a transform of said generating function; and dividing said transform of said generating function by said Fourier transformed image to obtain the encrypted PIN. The decryption of a PIN comprises obtaining a coherent optical beam modulated with an image of the biometric; obtaining a beam carrying an optical Fourier transform of said biometric image; addressing a full-complex spatial light modulator (SLM) with the encrypted PIN; illuminating said SLM with said beam carrying the Fourier transform of the biometric image to obtain an output beam; obtaining an optical transform of said output beam; registering an intensity distribution of said transformed output beam; and calculating dot products of said intensity distribution with each basis function to obtain the PIN.

In the second embodiment of the invention, the encrypted PIN is written into a reflective hologram which is nondestructively attached to a personal card, and the decryption of a PIN comprises illuminating the hologram with the beam carrying the Fourier transform of the biometric image.

The third embodiment of the invention comprises registering an intensity distribution of Fourier spectrum of said biometric image; processing said intensity distribution; deriving a cipher function from said processed intensity distribution; obtaining a product of the transform of the generating function and a complex exponent of said cipher function to obtain the encrypted PIN. The decryption of a PIN comprises deriving a cipher function from said processed intensity distribution of the Fourier spectrum of the biometric image; addressing a full-complex SLM with the encrypted PIN; addressing a second phase-only SLM with the sign-inversed cipher function; illuminating said first SLM with a coherent light beam to obtain a beam modulated with said encrypted PIN; illuminating said second SLM with said modulated beam to obtain an output beam; registering an intensity distribution of the transformed output beam; and calculating dot products of said intensity distribution and each basis function to obtain a PIN.

The fourth embodiment of the invention realizes a method of holographic phase conjugation using the intensity distribution of Fourier spectrum of the biometric image as a cipher. The fifth and sixth embodiments of the invention comprise processing the intensity distribution of the Fourier spectrum of the biometric image; deriving a unique vector from said processed intensity distribution; and encrypting said PIN with a symmetric block algorithm, said unique vector being a key to said algorithm.

Furthermore, a PIN which is confidential can be used to generate symmetric or asymmetric encryption/decryption key(s), which can then be used to both encrypt and decrypt information in a storage medium such as a smart or optical card or a hard disk.

BRIEF DESCRIPTION OF THE DRAWINGS

In the figures which disclose example embodiments of the invention:

FIGS. 6a, 6b are block diagrams for encrypting and decrypting information, respectively.

DESCRIPTION OF THE PREFERRED EMBODIMENTS

In the present invention, two basic methods—optical and digital (or hybrid)—for encrypting and decrypting PINs with biometric information signals are considered. By biometric information signal is meant an optical or digital signal modulated by the information characteristics of a biometric.

For decryption by optical methods, a light beam is impressed with biometric information and the PIN is decrypted by illuminating a spatial light modulator (SLM) or a hologram containing an encrypted PIN with the light beam. After a series of optical transformations, such as Fourier, Fresnel, etc., an output optical signal is registered by a camera. The PIN is decrypted by analysing the output intensity distribution.

The digital methods deal with deriving a unique vector from the biometric information. This unique vector serves as a cipher both for encrypting and decrypting the PIN. In this case a powerful block algorithm may be used (see, for example, B. Schneier, Applied Cryptography, Wiley, New York, 1994). Note that the key of the algorithm—the unique vector—is not stored anywhere and is not memorized by anyone: it may be derived only from the proper biometric. The optical methods are faster (in case of decryption) and more robust than digital methods; the latter, however, provide more secure encryption.

Figure 1A:
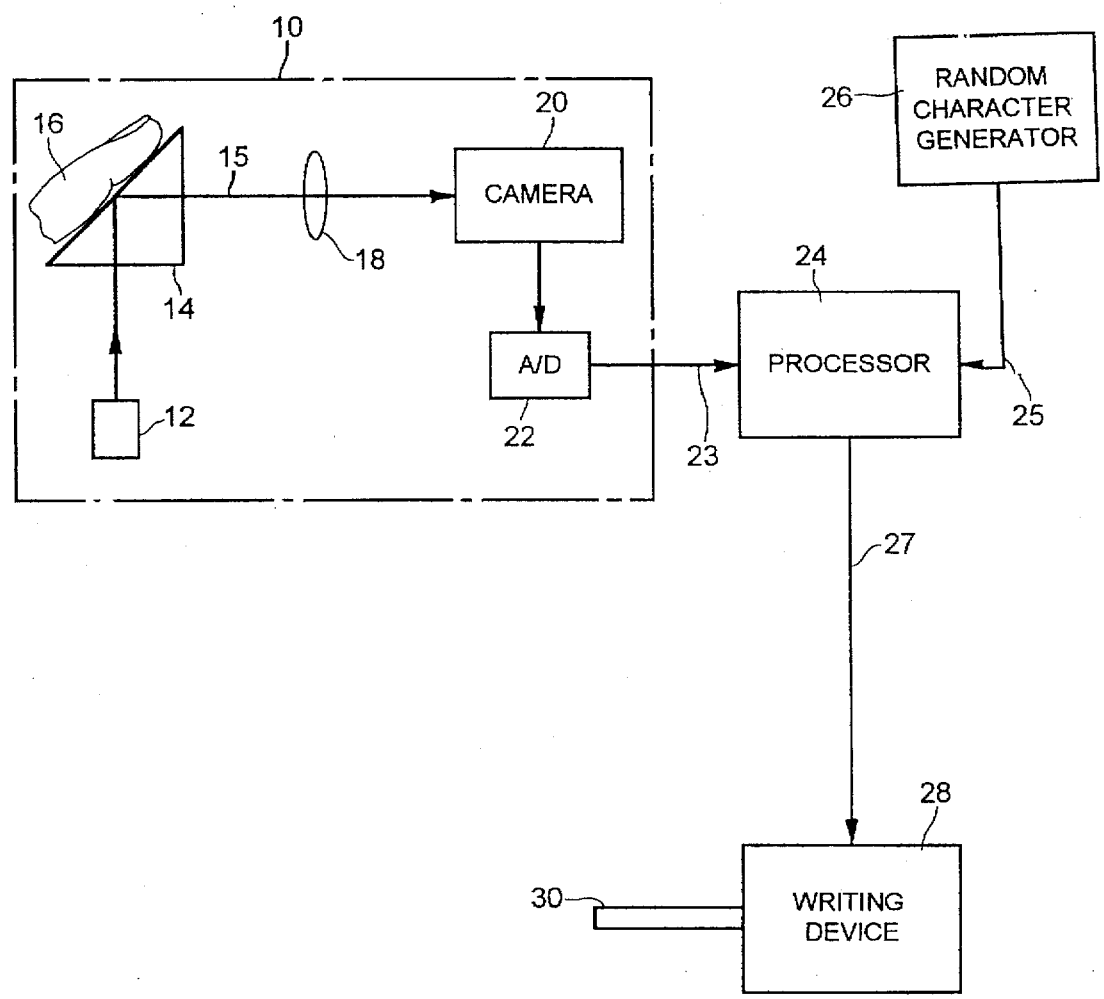
FIGS. 1a, 3a, and 5a are schematic illustrations of embodiments of the PIN encrypting device.
Figure 1B:
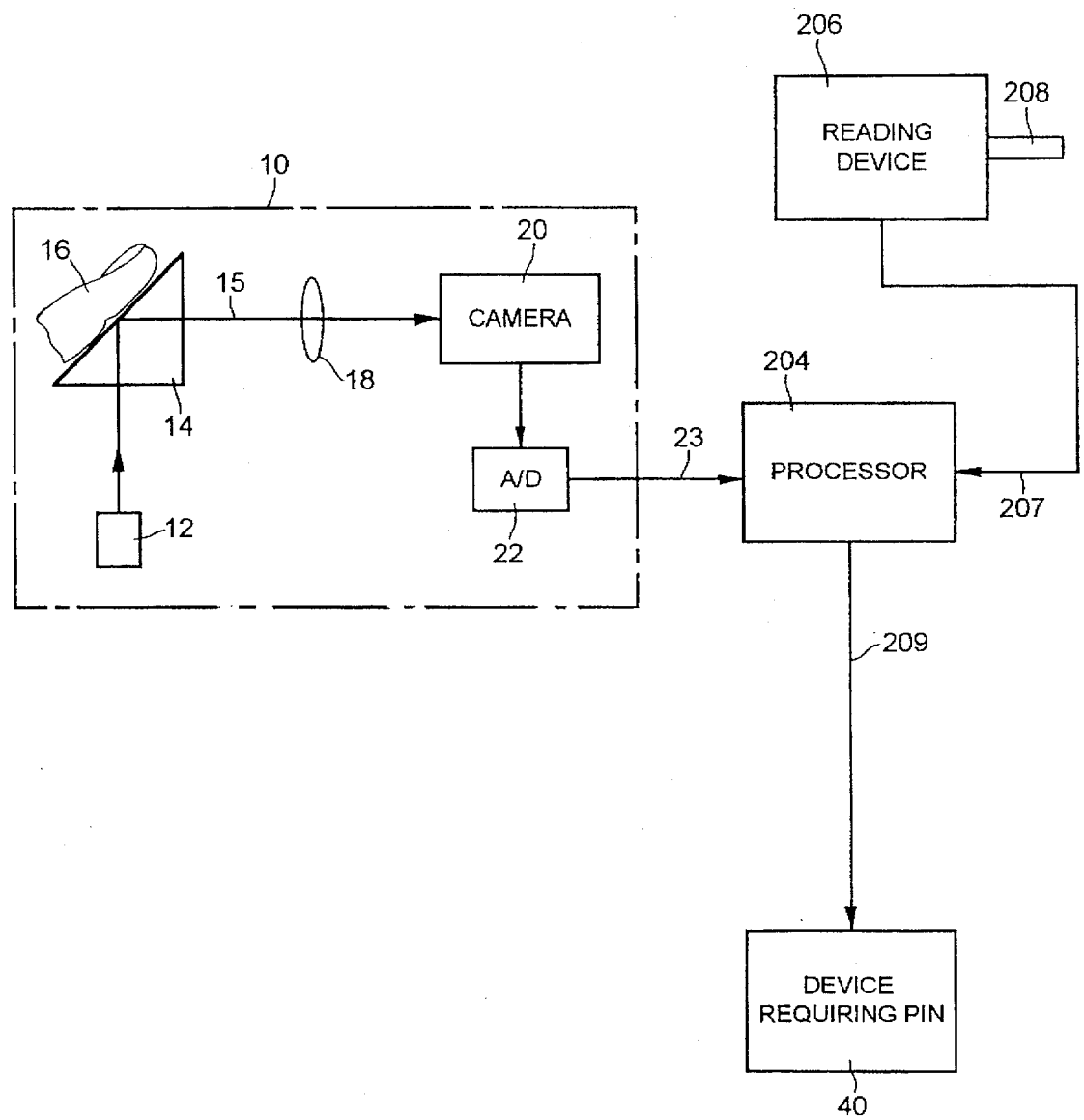
FIGS. 1b, 2, 3b, 4, and 5b are schematic illustrations of embodiments of the PIN decrypting device.

In FIGS. 1a, 1b, a basic conception of the method and apparatus for generating a PIN is illustrated. The PIN generating apparatus includes an encrypting device (FIG. 1a) and a PIN decrypting device (FIG. 1b). Each of them in turn comprises a biometric input device 10, a processor 24 (or 204) for encrypting (or decrypting) a HN with biometric-related information, and means 28 (or 206) for writing (or reading) and storing the encrypted PIN. The biometric input device 10 registers information about a user's biometric and, if necessary, transforms it to a digital form. Further, for the sake of clarity, we will be talking about fingerprint-related information, but it should be apparent to those skilled in the art that an input device could register information impressed with characteristics from other body parts, such as an iris or retina, vein structure of a hand, etc.

A simplified scheme of the fingerprint input device which we will follow for certainty comprises a source of light 12 which may be coherent, a total internal reflection prism 14, an imaging or Fourier transform lens 18, a camera 20 of the type which registers a two-dimensional array, such as a CCD or CMOS camera, an analog-to-digital converter 22 having a digital output 23 to the processor 24 (or 204). In fact, various types of imaging systems utilizing incoherent light also may be used.

Referencing FIG. 1a, an individual who wishes to be enrolled places his/her finger 16 onto the prism 14. An optical beam 15 reflected from the prism surface is modulated with the characteristics of the fingerprint and then focused onto the camera 20. The digital information characterizing fingerprint pattern (the biometric information signal) goes to the processor 24 via the output 23. A random character generator 26 generates a digital PIN to be encrypted and outputs 25 to the processor 24. The latter encrypts the PIN with the fingerprint-related information and sends the encrypted PIN to the writing device 28 which stores it into storage means 30, such as a card (a credit card, a smart card, an optical card, etc.) or a central database.

It should be noted that the individual does not need (and does not have) to remember his/her PIN. If the card has been lost or stolen, this will not affect the security of the system because the PIN can be decrypted only with the proper fingerprint.

To obtain an access to a communication network, financial device or to another system where a PIN is required, the decrypting device (FIG. 1b) is used. The individual places the finger 16 onto the input prism of the decrypting device, and the processor 204 receives the fingerprint-related information which serves as a key to the encrypted PIN. The latter is read from the storage means 208 by the device 206 and is sent to the processor 204. If the fingerprint is the same as was used during encryption, the processor decrypts the PIN and sends it on line 209 to a device or system 40 requiting a PIN.

In the first embodiment of the invention (FIG. 1a), the camera 20 captures a biometric image (the lens 18 is an imaging one). The random character generator 26 generates a series of characters, $a_n$, (n=1, 2, ... N), which corresponds to a PIN to be encrypted, where N is the total length of the PIN. Then the processor 24 constructs a 2D generating function, s(r), using the numbers an as coefficients of an expansion over known basis functions, $\psi_n(r)$:

$$s(r)=[\Sigma_1^N a_n\psi_n(r)]^{1/2} \qquad (1)$$

Here r is a vector in 2D spatial domain. The real functions $\psi_n$ are chosen to be orthogonal and normalized. Let us define f(r) as a 2D function representing the biometric image; F(q) is its Fourier transform where q is a vector in 2D generalized frequency domain. The processor 24 performs a transformation, T, of the function s(r):

$$S(q)=T(s(r)), \qquad (2)$$

such that the transformation T has an inverse transform, $T^{-1}$, which exists and can be obtained optically; and, the actual spatial frequencies of the transform S(q) overlap those of F(q). After obtaining the Fourier transform F(q), the processor removes from the spectrum any undesirable spatial frequencies (such as dc) which do not contain any useful information. The processor then divides S(q) by F(q) for values of q where $|F(q)| \geq F_0$ ($F_0>0$) and obtains the complex function $$A(q)=S(q)/F(q), \text{ for } |F(q)|\geq F_0 \qquad (3)$$

To avoid singularities resulting from values where |F(q)| is close to 0, A(q) is defined as:

$$A(q)=S(q)\exp(-i\arg F(q))/F_0, \text{ for } |F(q)|<F_0 \qquad (4)$$

The function A(q) presented as a 2D complex array is stored in the storage means 30 (such as a card) by the writing device 28.

Figure 2:
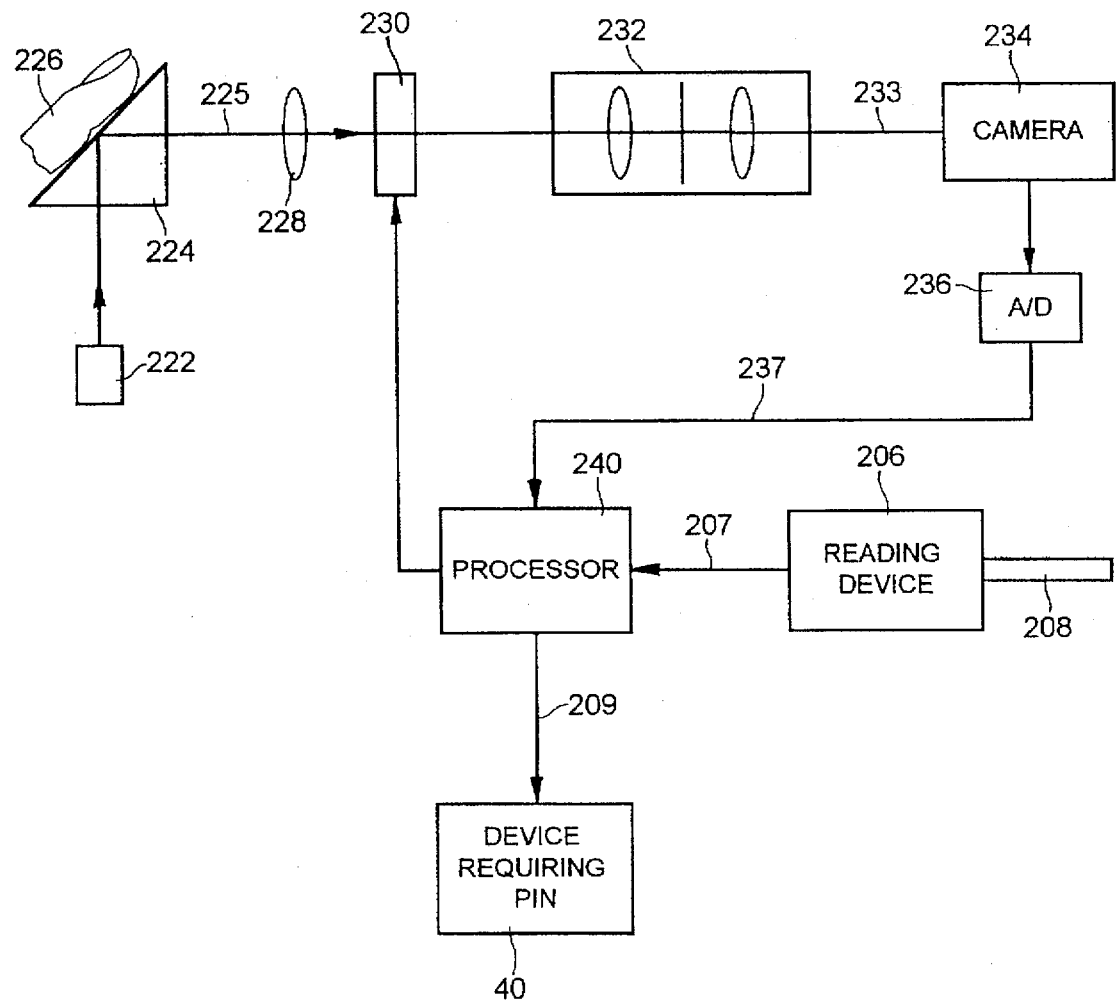

Referring to FIG. 2, a decrypting device for the first embodiment of the invention comprises a source of coherent light 222, an input prism 224, a Fourier transform lens 228, a full-complex spatial light modulator (SLM) 230, means 232 performing optically a transformation, $T^{-1}$, which is inverse to the transformation T used during encryption (Eq. 2), a CCD camera 234 with A/D converter 236 outputting to a processor 240. To retrieve a PIN, an individual places a finger 226 onto the prism. The reflected beam 225 is modulated with characteristics of a fingerprint image, f(r). The lens 228 performs optically the Fourier transform of the image f(r), so that at the SLM plane the beam is modulated with the complex function F(q). A reading device 206 reads the function A(q) (see Eqs. 3, 4) from storage means 208 (such as a card), and the processor 240 addresses the SLM with A(q) (i.e. the complex transmittance of the SLM is proportional to A(q) ). If the fingerprint is the same as was used during encryption, the product of the functions F(q) and A(q) yields S(q) in the output of the SLM. After passing through the means 232 performing optically the inverse transformation $T^{-1}$, the beam 233 is focused onto the camera 234 which registers an intensity distribution $I(r) \propto |s(r)|^2$ containing, in accordance with Eq. 1, the information about the PIN. The implementation of means 232 depends upon a number of factors such as available space and the type of optical inverse transform and means 232 may consist of lenses, holographic optical elements (HOE), diffusers, etc. It may also include some nonlinear devices, for example, photoconductive sandwiched systems, photorefractive media, etc. To retrieve the PIN, the processor 240 calculates the coefficients $a_n$ from the intensity distribution I(r) (registered by the camera) using the orthogonality of the basis functions $\psi_n$:

$$a_n \propto \int I(r)\psi_n(r)dr \qquad (5)$$

To avoid a dependence on the absolute value of the intensity, ratios of the coefficients $a_n$ are used for obtaining the PIN. To maximize signal-to-noise ratio in the output of the camera, the basis functions may be chosen as delta-shaped functions, $$\psi_n(r)=h(r-r_n), \qquad (6)$$

where $h(r-r_n)$ essentially distinct from 0 only in the small vicinity of $r_n$ (the dimension of this vicinity should be of the same order of magnitude as a correlation radius of the fingerprint image function f(r)). In this case the camera 234 will register a set of narrow peaks positioned at $r_n$ (n=0, 1, ...) and with intensities proportional to $a_n$. The information about both $r_n$ and $a_n$ may be used to obtain the PIN. If the fingerprint used during decryption is different from that used during encryption, the camera 234 will register only a noisy pattern, and the correct (or any) PIN will not be obtained. One experienced in the art can also use a reflective SLM in place of a transmissive SLM with appropriate architectural changes to achieve the same results.

Figure 3A:
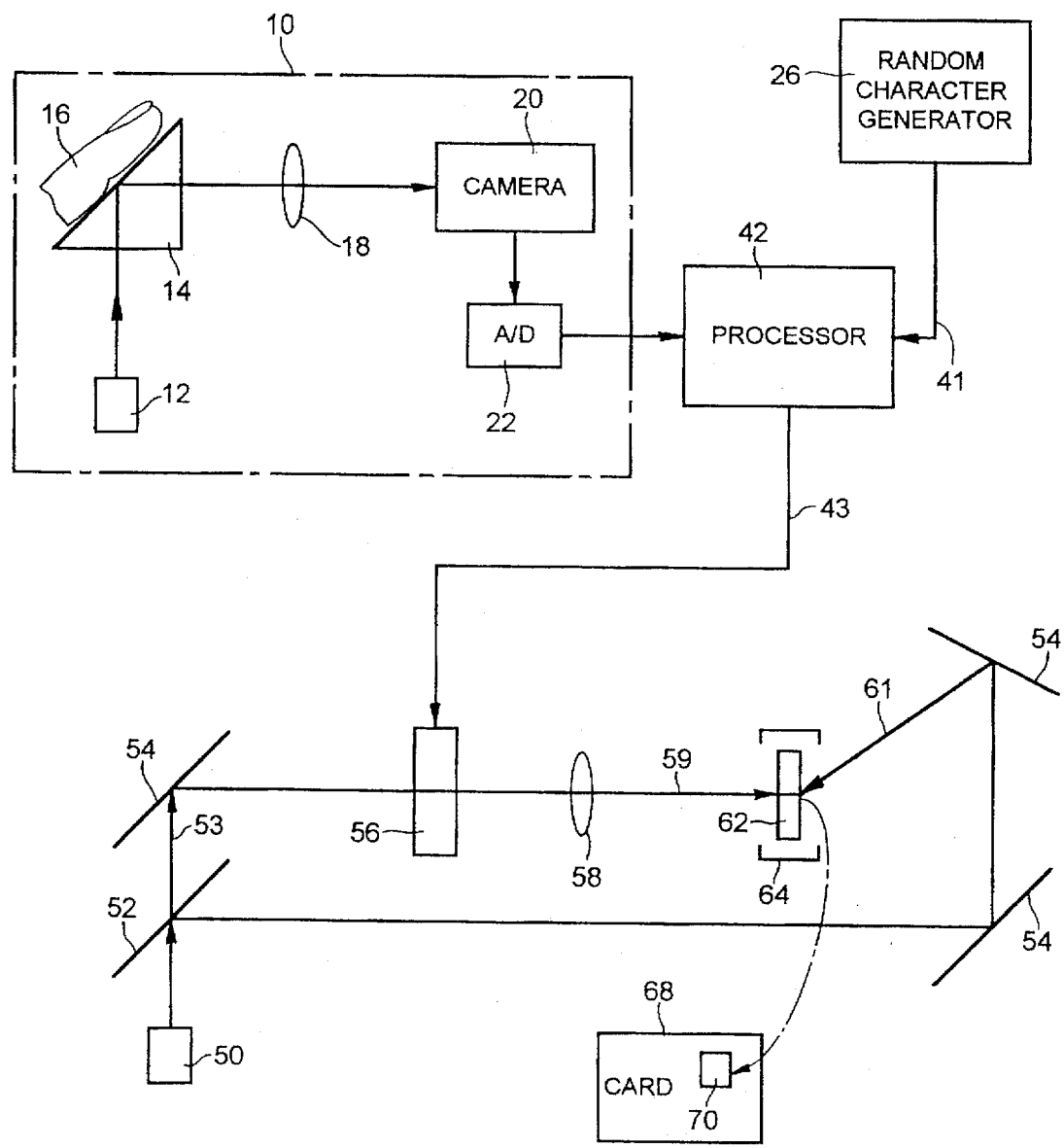
Figure 3B:
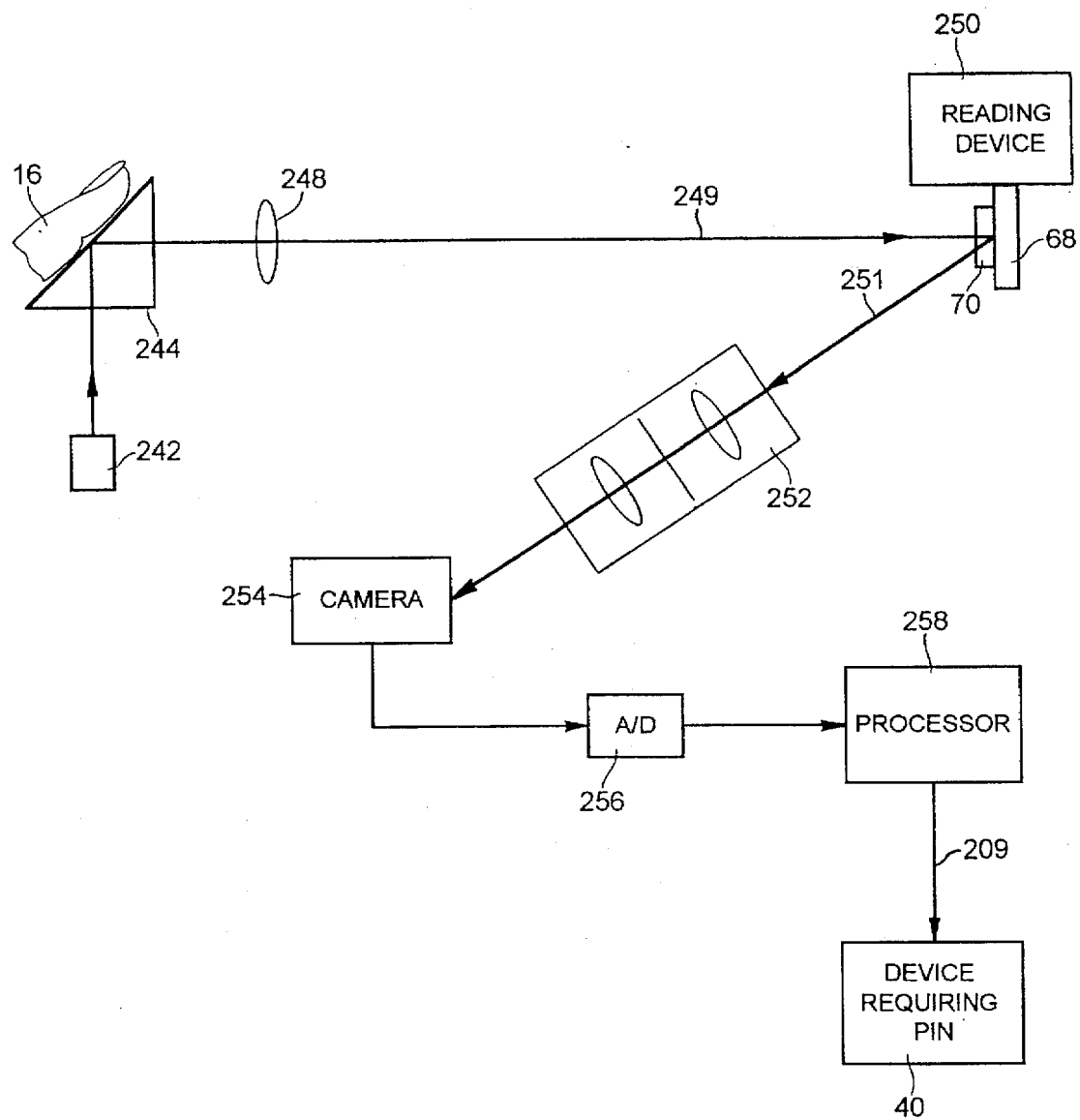

In the second embodiment of the invention (FIGS. 3a, 3b), a holographic method for encrypting and decrypting the PIN is used. In encryption (FIG. 3a), a processor 42 obtains a function A(q) in the same manner as it has been described for the first embodiment. Then a reflective hologram is recorded, the function A(q) being a complex amplitude of the holographic grating. The hologram can be prepared by several methods: it may be computer-generated or made optically by means of two-beam interference. In a preferred embodiment (FIG. 3a), the apparatus for preparing a hologram comprises a source of coherent light 50, beam splitter 52, mirrors 54, full-complex SLM 56, a Fourier transform lens 58, and support 64 supporting recording medium 62.

Preparing the hologram comprises several steps. The processor 42 performs the inverse Fourier transform of the function $A^*(q)$ as defined by Eqs. 3 and 4 to obtain a 2D complex function, a(r):

$$a(r)=FT^{-1}(A^*(q)) \qquad (7)$$

(here "*" means complex conjugation).

The SLM 56 addressed with said function a(r) is illuminated by coherent light beam 53 from the source 50. The lens 58 performs optically Fourier transform of the SLM plane into the plane of recording medium 62. The reference beam 61 which does not carry any useful information interferes with beam 59 on the medium 62, so that the hologram is recorded. After developing (if necessary), the hologram 70 is nondestructively attached to a personal card 68. In this embodiment, the reflective hologram is produced by the interference of two counterpropagating light beams 59 and 61 meeting the Bragg condition. A reflective hologram may be also recorded as a thin hologram on a medium with variable relief (such as a thermoplastic medium).

A holographic decrypting device of the second embodiment (FIG. 3b) comprises a source of coherent light 242, an input prism 244, Fourier transform lens 248, a pre-recorded reflective hologram 70 attached to the card 68, means 252 performing optically a transformation, $T^{-1}$, which is inverse to the transformation T used during encryption (Eq. 2), a CCD camera 254 with A/D converter 226 outputting to a processor 258. If the hologram 70 is thick or volume, the wavelength of the source 242 has to coincide with the wavelength of the source 12 (FIG. 3a) which was used during encryption, and the angle of incidence of beam 249 on the hologram 70 has to be equal to the angle of incidence of the beam 61 (of FIG. 3a) on the holographic recording medium 62.

The beam 249 modulated with characteristics of the fingerprint image impinges on the hologram 70 and is diffracted from it. An output beam 251 is observed in the direction corresponding to the direction of reference beam 61 (of FIG. 3a) used during encryption. The output beam 251 passes through the means 252 performing the inverse transform $T^{-1}$, and the reconstructed 2D function $|s(r)|^2$ is registered by the camera 254. The remainder of the operations is the same as in the first embodiment.

In the third embodiment of the invention, an intensity distribution, $|F(q)|^2$, of the Fourier spectrum of a fingerprint image (the biometric information signal) is obtained and used as a cipher to encrypt a PIN. In encryption (FIG. 1a), the lens 18 performs Fourier transform of the input image, f(r), so that the camera 20 registers the intensity distribution, $|F(q)|^2$. At the next step the processor 24 derives a cipher function, $\psi(q)$, from the intensity distribution:

$$\psi(q)=O(|F(q)|^2), \qquad (8)$$

where O is an operator. First, the operator O processes the function $|F(q)|^2$ to enhance its consistency, for example, by mapping the initial distribution $|F(q)|^2$ with a saturation function. Second, the operator O performs an additional randomization of the intensity distribution. For example, a function $u_2(r)$ can be obtained with a random number generator seeded with $|F(q)|^2$, so that the function $u_2(r)$ will be randomly distributed versus r and will completely overlap the transform S(q) (see Eq. 2) to be encrypted. Third, the operator O may process the function $u_2(r)$ with a Gabor transform, $$u_3(x, y)=\iint \exp[-i\omega_1(x-x')-i\omega_2(y-y')-(x-x')^2/\alpha_1^2-(y-y')^2/\alpha_2^2]u_2(x', y')dx'dy', \qquad (9)$$

and, in some cases, may perform binarization $$Re\ u_4=1\ \text{if}\ Re\ u_3>0,\ Im\ u_4=1\ \text{if}\ Im\ u_3>0$$

$$Re\ u_4=0\ \text{if}\ Re\ u_3<0,\ Im\ u_4=0\ \text{if}\ Im\ u_3<0 \quad (10)$$

and/or quantization:

$$u_5=0\ \text{if}\ u_4=(1,1),\ u_5=\pi/2\ \text{if}\ u_4=(1,0)$$

$$u_5=-\pi/2\ \text{if}\ u_4=(0,1),\ u_5=\pi\ \text{if}\ u_4=(0,0) \quad (11)$$

The cipher function $\psi(q)$ may be chosen as $\psi(q)\equiv u_5(q)$ or $\psi(q)\equiv u_5(q)$.

The next steps comprise generating coefficients an corresponding to a PIN to be encrypted, obtaining the function $s(r)$ to be encrypted (Eq. 1) and its transform $S(q)$ (Eq. 2). Then the processor 24 performs a further transformation, $T_2$. The transformation $T_2$ is chosen such that an inverse transformation, $T_2^{-1}$, exists and can be performed optically. Then the processor obtains a complex 2D function, $B(q)$:

$$B(q)=T_2(S(q)\exp(i\psi(q))) \quad (12)$$

The function $B(q)$ presented as a 2D complex array is stored in the storage means 30 (such as a card).

Figure 4:
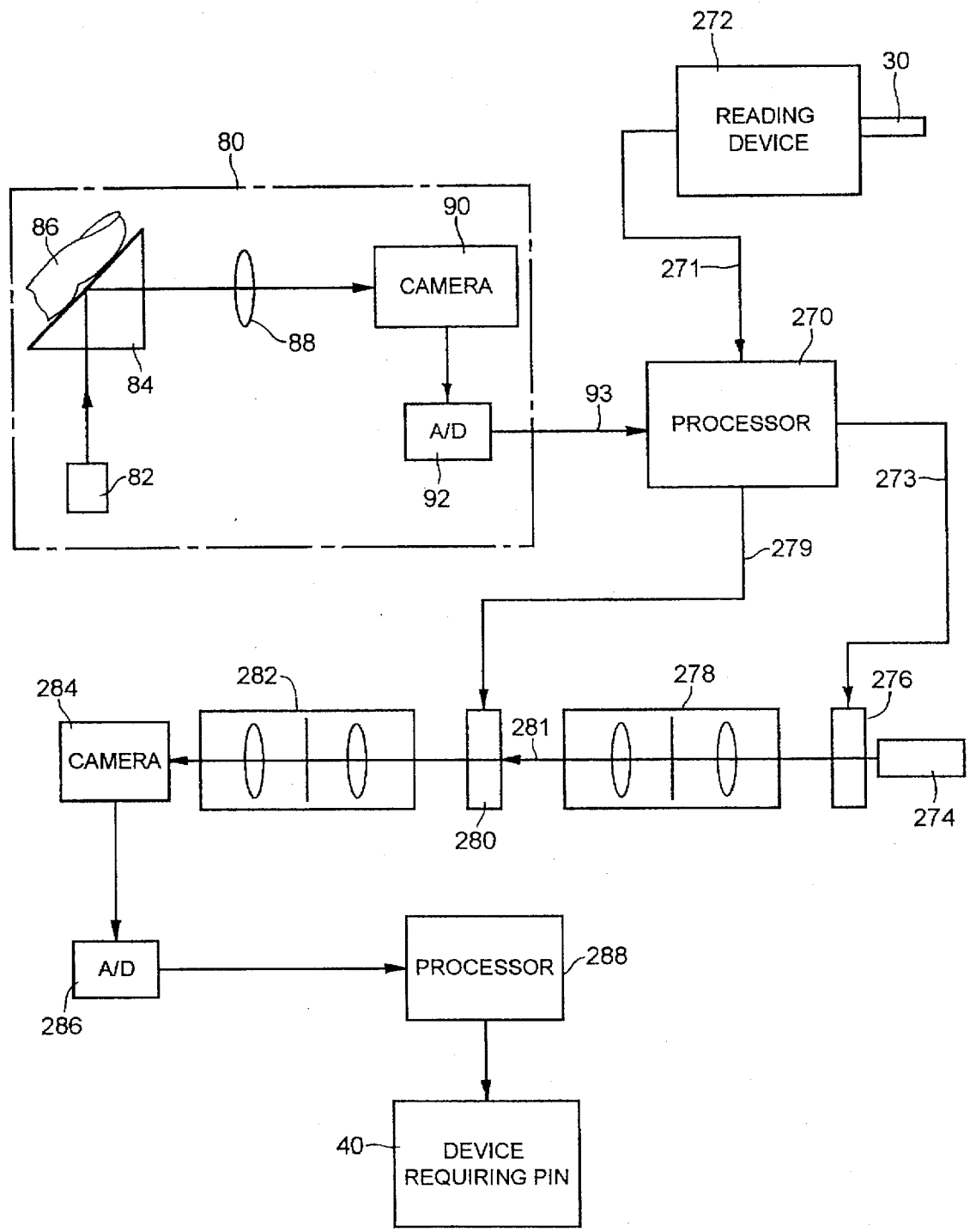

Referring to FIG. 4, a decrypting device of the third embodiment of the invention comprises an input device 80 which is the same as in encryption, a processor 270, a source of coherent light 274, a full-complex SLM 276, a phase-only SLM 280, means 278 and 280 performing optically the transformations $T_2^{-1}$ and $T^{-1}$ respectively, a CCD camera 284 with A/D converter 286 outputting to a processor 288. The processor 270 receives the function $B(q)$ from reading device 272 and addresses the first SLM 276 with $B(q)$. The processor 270 also receives the intensity distribution $|F(q)|^2$ from the input device 80, derives a cipher function, $\psi(q)$, in the same way as it was done during encryption and addresses the phase-only SLM 280 with $(-\psi(q))$. A coherent light beam passes through SLM 276, so that in the output of SLM 276 it is modulated with $B(q)$. After passing through the means 278 performing the transformation $T_2^{-1}$, the beam 281 is modulated with $S(q)\exp(i\psi(q))$ and impinges on the phase-only SLM 280. If the function $\psi(q)$ obtained from the intensity distribution $|F(q)|^2$ in decryption is the same as it was in encryption, the product of the functions $S(q)\exp(i\psi(q))$ and $\exp(-\psi(q))$ yields $S(q)$ in the output of the SLM 280. After passing through the means 282 performing optically the inverse transformation $T^{-1}$, the beam 281 is focused onto the camera 284 which registers an intensity distribution $I(r)\propto|s(r)|^2$. The remainder of the operations is the same as in the first embodiment.

In the fourth embodiment of the invention (FIGS. 5a, 5b), a holographic method for encrypting and decrypting a PIN is used. In encryption (FIG. 5a), a processor 102 receives an intensity distribution, $|F(q)|^2$, of the Fourier spectrum of a fingerprint image, $f(r)$, from an input device 80 which is the same as in the third embodiment. Then the processor derives a cipher function, $\psi(q)$, in the same manner as it has been described for the third embodiment. A reflective hologram is recorded, the function $B(q)$ (see Eq. 12) being a complex amplitude of the holographic grating. The apparatus for recording a hologram comprises a source of coherent light 110, beam splitter 112, mirrors 114, amplitude-only SLM 120, phase-only SLM 124, means 122 and 126 performing optically the transformations $T$ (Eq. 2) and $T_2$ (Eq. 12), respectively, and support 118 supporting recording medium 116. The processor receives coefficients $a_n$ from the random character generator 26 and calculates a 2D function $S(r)$ (Eq. 1) to be encrypted. The amplitude-only SLM 120 is addressed with $s(r)$, and the phase-only SLM 124 is addressed with the fingerprint-related function $\psi(q)$. A beam 115 consequently passes through the SLM 120 (output: $s(r)$), the optical transformation means 122 (output in front of SLM 124: $S(q)=T(s(r))$), the SLM 124 (output: $S(q)\exp(i\psi(q))$), the optical transformation means 126 (output in front of the medium 116: $T_2(S(q)\exp(i\psi(q)))$) and interferes on the recording medium 116 with a reference beam 117. After developing (if necessary) the reflective hologram 312 is nondestructively attached to a card 130.

A holographic decrypting device of the fourth embodiment (FIG. 5b) comprises the fingerprint input device 80, a processor 300, a source of coherent light 310, a pre-recorded reflective hologram 312 attached to the card 130, phase-only SLM 316, means 314 and 318 performing optically the transformations $(T_2^*)^{-1}$ and $(T^*)^{-1}$ respectively, a CCD camera 320 with A/D converter 322 outputting to a processor 324.

The method of decryption realizes the principle of optical phase conjugation. The processor 300 receives the intensity distribution $|F(q)|^2$ from the input device 80, derives a cipher function $\psi(q)$ and addresses the phase-only SLM 316 with $(-\psi(q))$. A coherent light beam 311 impinges on the hologram in the direction opposite to the reference beam 117 (FIG. 5a) during encryption. The diffracted beam 313 is reflected in the direction corresponding to the first order of diffraction, and has a complex amplitude $T_2^*(S^*(q)\exp(i\psi(q)))$. The means 314 performs optically the inverse transformation $(T_2^*)^{-1}$, so that in the plane of SLM 316 the beam amplitude is equal to $S^*(q)\exp(i\psi(q))$. If the function $\psi(q)$ obtained from the intensity distribution $|F(q)|^2$ in decryption is the same as in encryption, the product of the functions $S^*(q)\exp(i\psi(q))$ and $\exp(-\psi(q))$ (which is a transmittance of the SLM 316) yields $S^*(q)$ in the output of the SLM 316. After passing through the means 318 performing optically the inverse transformation $(T^*)^{-1}$, the beam amplitude is equal to $s^*(r)$ in the plane of the CCD camera, which, hence, registers an intensity distribution $|s(r)|^2$. With this information the processor 324 retrieves the PIN (see Eq. 5) and sends it to the public key encrypting device 210 or device 40 requiring a PIN.

All embodiments described above relate to optical methods. Now we shall describe digital methods.

Figure 5A:
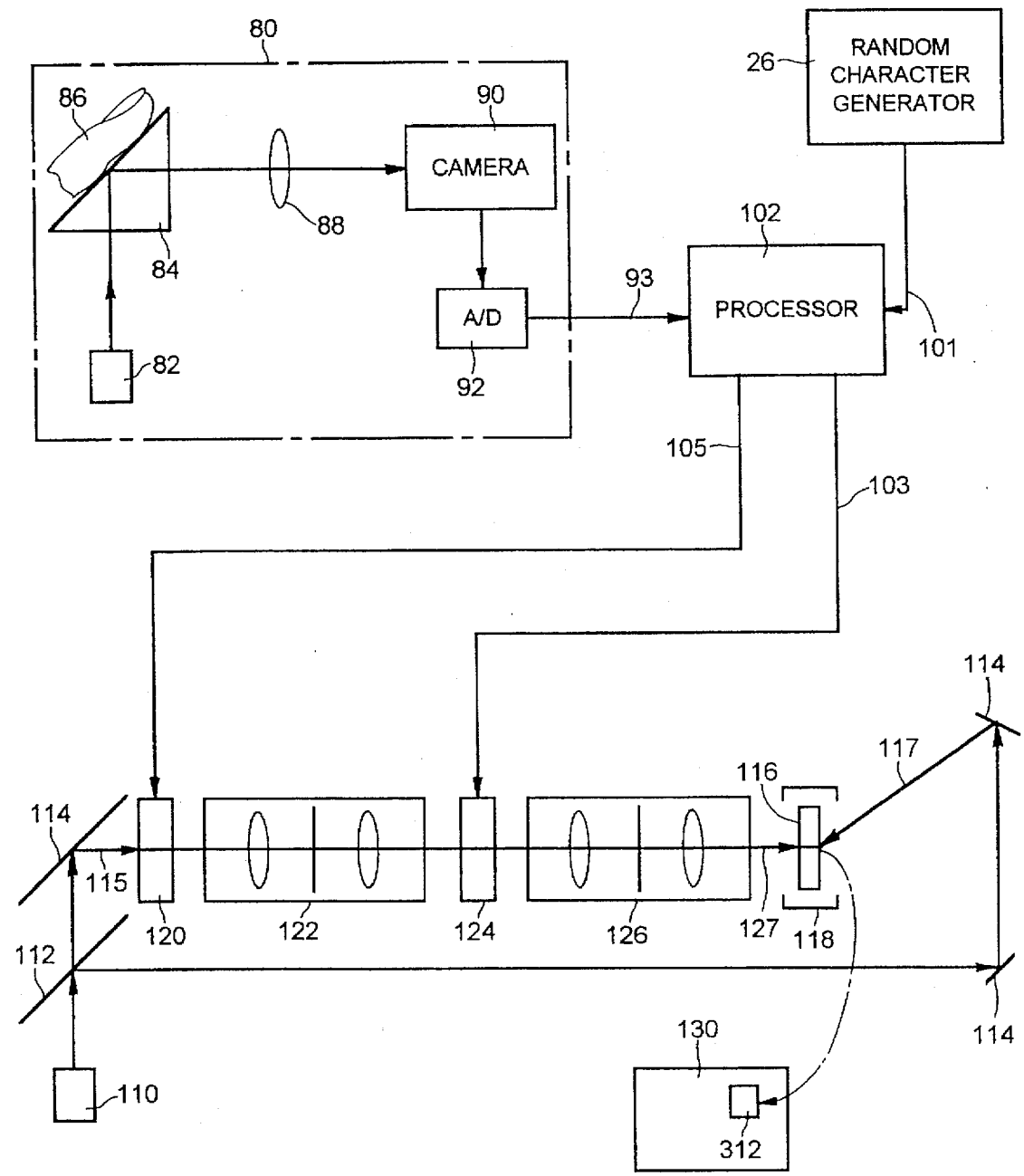
Figure 5B:
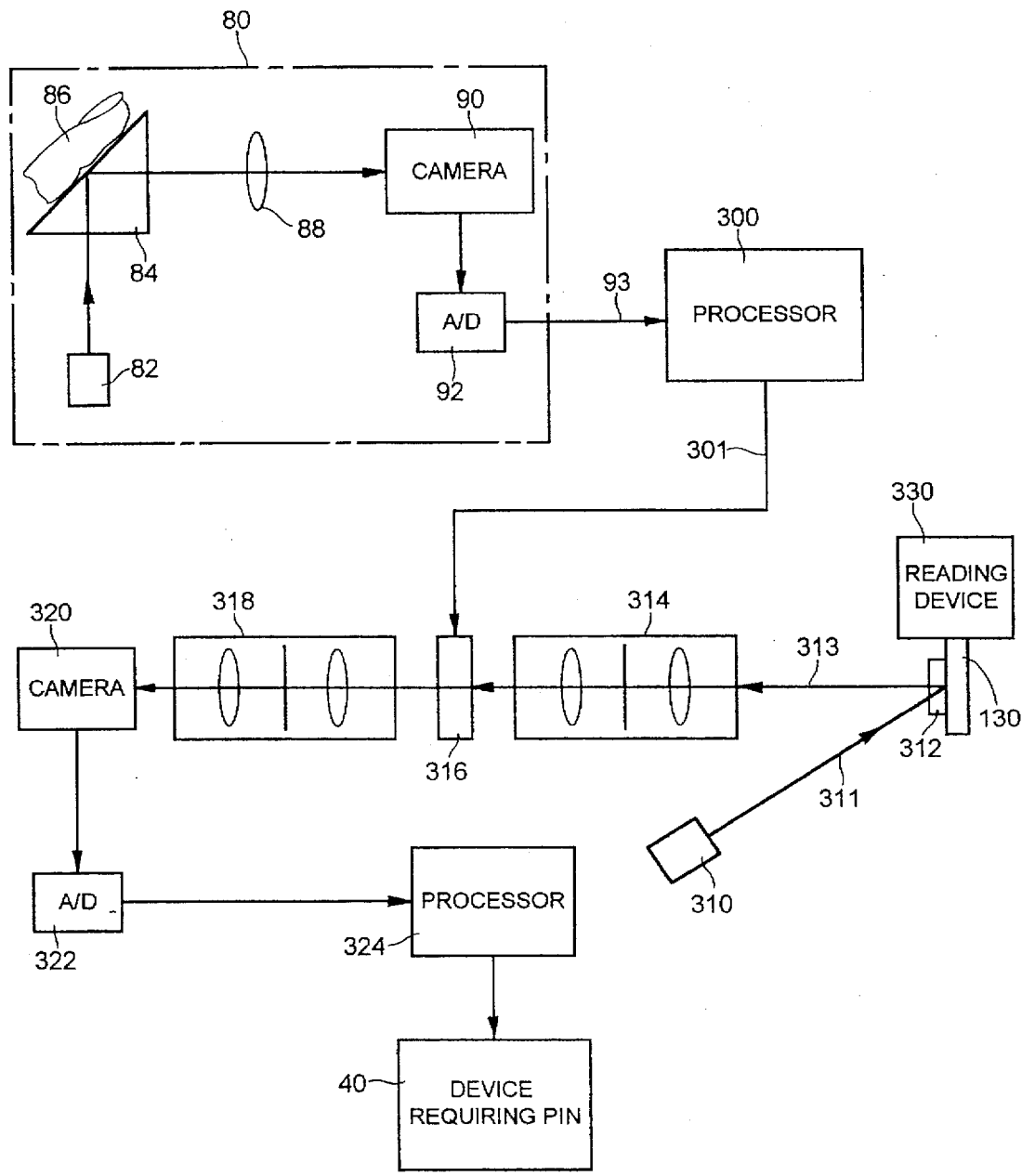

In the fifth embodiment of the invention (FIG. 1a), a processor 24 receives an intensity distribution, $|F(q)|^2$, of Fourier spectrum of a fingerprint image, $f(r)$, from an input device 10 (which is the same as input device 80 of FIGS. 4, 5a, 5b in the third and the fourth embodiments). Then the processor 24 derives a unique vector, b (a biometric information signal), from the intensity distribution $|F(q)|^2$. A PIN, which is generated by a random character generator 26, is enciphered with a symmetric algorithm, E (such as DES, IDEA, REDOC, etc.,—see, for example, the aforementioned book by Schneier) using the vector b as a key:

$$c=E_b(\text{PIN}) \quad (13)$$

An enciphered PIN, c, is written into storage means 30 (such as a card). In decryption (FIG. 1b), the processor derives the same unique vector b, if the fingerprint is the same. The PIN is decrypted with an inverse algorithm, $E^{-1}$, using b as a key:

$$\text{PIN}=E_b^{-1}(c) \quad (14)$$

A method for deriving a unique vector b from the intensity distribution $|F(q)|^2$ comprises the following. Firstly the input function $|F(q)|^2$ is processed to enhance its consistency, for example, by mapping the initial distribution $|F(q)|^2$ with a saturation function. Then the processor may also perform a Gabor transform, for example, as defined by Eq. 9 (or an analogous integral in a polar coordinate system). In any event, a 2D processed array, $D_{ik}$, (or two arrays, Re $D_{ik}$ and Im $D_{ik}$, in case of Gabor transform) is obtained. The next step comprises scanning over the array $D_{ik}$ (or Re $D_{ik}$, Im $D_{ik}$) to find the positions and amplitudes of a certain number, J, of the highest peaks in the array. The coordinates of the peaks are then transformed to a polar coordinate system ($\rho$, $\phi$), the center $\rho=0$ of which corresponds to the zeroth spatial frequency in a Fourier q-domain. A vector $b'=\{b_j'\}$ is defined such that each j-th element, $b_j'$, is a 3D vector comprising the relative polar coordinates of the peaks and their amplitudes $D_j$, so that $b_j'=(\rho_j, \phi_j-\phi_o, D_j)$, j=1, 2, ... J. Here $\phi_o$ is an angular position of a chosen (standard) peak, for example, the highest one. We define the coordinates of the peaks with their relative positions, $\phi_j-\phi_o$ to make the algorithm invariant to a possible rotation of a finger. A total number of the elements in the vector b' is equal to 3J-1. If we take the number of peaks J=10 and assume that each element of the vector $b_j'$ contains 3 bits of information (i.e. each value is scaled with 8 levels), we will obtain 3×(30-1)=87 bits, which is sufficient for a key size (56 bits) in DES algorithm. If we use the Gabor transform, the total number of the elements may be doubled (because of two arrays—Re $D_{ik}$ and Im $D_{ik}$), so that the amount of information will be sufficient for most block algorithms (128 bits for IDEA, 160 bits for REDOC II, etc.). Finally, the processor extracts from b' the number of elements which is required by the symmetric algorithm in order to form the unique vector b.

The sixth embodiment of the invention deals with another method for deriving a unique vector from $|F(q)|^2$. The first step, which is processing the input distribution $|F(q)|^2$ with a saturation function and with a Gabor transform, coincide with the fifth embodiment, such that a 2D processed array, $D_{ik}$, is obtained. The next step comprises transforming $D_{ik}$ to a polar coordinate system ($\rho$, $\phi$). Then the 2D function $D(\rho, \phi)$ obtained is expanded over spherical harmonics $Y_{l,m}(\theta, \phi)$:

$$D(\rho,\phi) = \sum_{l=0}^{\infty} \sum_{m=-l}^{m=l} \alpha_{lm} Y_{l,m}(\theta,\phi), \quad (15)$$

where $$Y_{l,m}(\theta,\phi)=[(2l+1)(l-|m|)!/(4\pi(l+|m|)!)]^{1/2} P_l^{|m|}(\cos\theta) e^{im\phi}; \quad (16)$$

$P_l^m(\cos\theta)$ are the associated Legendre functions;

$$\rho/\rho_{max}=\chi(\theta), \quad (17)$$

where $\chi(\theta)$ is a function which maps the distribution $D(\rho, \phi)$ onto a sphere having the radius $\rho_{max}$ (for example, $\chi(\theta)=\sin\theta$).

To derive the coefficients $\alpha_{lm}$, the processor calculates the integrals:

$$\alpha_{lm} = \int_0^{2\pi} d\phi \int_0^{\pi} D(\rho_{max}\chi(\theta),\phi) Y_{l,m}(\theta,\phi) d\theta \quad (18)$$

The unique vector, b, comprises a set of values $|\alpha_{lm}|^2$ or their ratios (for example, the values $|\alpha_{lm}|^2$ divided by $|\alpha_{00}|^2$. For each l, there are (2l+1) numbers of m, because m=0, ±1, ... ±l. If we calculate the coefficients $\alpha_{lm}$ up to l=L, the total number of $\alpha_{lm}$ will be 1+(2+1)+...+(2L+1)=(L+1)$^2$. This means that only low numbers of L are required; for example, for L=4 we obtain 25 coefficients (in fact, some of them might be equal to 0 because of symmetry conditions). Note that the unique vector b is invariant to a fingerprint rotation.

The PIN requiring device, 40, may be an automated teller machine (ATM), facility access, or other security system. In addition, the PIN obtained in the above manner can be used to generate symmetric or asymmetric encryption key(s) to encrypt/decrypt information in a storage medium. By also storing the biometric encrypted PIN on the same storage medium, the "live" biometric would now serve as a secure access to the information. The biometric would decrypt the PIN which would then be used to generate the appropriate decryption key(s) to decipher the information stored in the storage medium.

More particularly with reference to FIG. 6a, a block diagram for encrypting confidential information includes a random character generator 402 which generates a digital PIN and outputs both to a processor 406 and to an encryption key function generator 410. The processor 406 receives a biometric information signal from a biometric input device 404 and encrypts the PIN with the biometric using one of the methods of the present invention. The encrypted PIN 408 is stored in storage means 430 (such as a card) in a position 418. The storage format may be either digital or optical (i.e. a hologram attached to the card). At the same time the encryption key function generator 410 receives the PIN from the random character generator 402 and generates an encryption key (symmetric or asymmetric). An encryption algorithm 414 encrypts confidential information 412 (which may be, for example, medical information) with the encryption key. The encrypted information 416 is stored in the same storage means 430 in a position 420 (in a digital format).

Now turning to FIG. 6b, a block diagram for decrypting confidential information includes the storage means 430 containing both the encrypted PIN (in the position 418) and the encrypted information (in the position 420). The processor 446 receives a biometric information signal and decrypts the PIN using one of the methods of the present invention. The decrypted PIN 448 goes to a decryption key function generator 450 which is the complement of the encryption key function generator 410 for asymmetric decryption or the same as 410 for symmetric decryption. The output of 450 is the required decryption key. Using said key in a decryption algorithm 452, one can decrypt the encrypted information obtained from the storage means 430. The output of the system contains the decrypted confidential information 454.

It should be apparent to one skilled in the art that the invention may be embodied in other specific forms without departing from the spirit or essential characteristics thereof. For example, input systems, other than systems utilizing the total internal reflection prism, such as imaging systems, are available in order to produce a fingerprint information beam. Some of these systems may register information impressed with characteristics from other body parts, such as an iris or retina, vein structure of a hand, etc.. Because an iris possesses a natural circular boundary, an iris image may be easily and consistently processed without performing Fourier transform. In this case some embodiments of the present invention would be realized in a simplier way.

Other modifications will be apparent to those skilled in the art and, accordingly, the invention is defined in the claims.

We claim:

1. A method for securely storing at least a personal identification number (PIN), comprising the following steps:
   obtaining a biometric information signal bearing information from a body part;
   generating a sequence of random characters to obtain a PIN;

obtaining a generating function such that said random characters of said PIN are parameters of said generating function;

obtaining a transform of said generating function;

encrypting said transform of said generating function with said biometric information signal to obtain an encrypted PIN; and writing said encrypted PIN into a store.

2. A method for recovering a personal identification number (PIN) for use in a device requiring a PIN for operation comprising the following steps:

obtaining a biometric information signal bearing information from a body part;

retrieving from storage an encrypted transform of a generating function, said generating function having characters of a PIN as parameters, said transform of said generating function previously encrypted with said biometric information signal;

decrypting said previously encrypted transform of said generating function utilising said biometric information signal as a key for decryption to obtain a decrypted transformed generating function;

undertaking an inverse transform operation on said decrypted transformed generating function to obtain an inverse transformed decrypted generating function; and obtaining parameters from said inverse transformed decrypted generating function to obtain a PIN.

3. The method of claim 1 including the steps of:

encrypting information with a key which is a function of said PIN; and storing said encrypted information on said storage means.

4. The method of claim 2 including the steps of:

retrieving encrypted information from said storage means; and decrypting said information with a key which is a function of said PIN.

5. The method of claim 1 wherein said step of obtaining a biometric information signal comprises obtaining a Fourier transform of a signal bearing information from a body part, said step of obtaining a transform of said generating function comprises obtaining a transform such that the transform has an inverse transform which exists and can be obtained optically and spatial frequencies which overlap with spatial frequencies of said Fourier transform of said signal bearing information from a body part and said step of encrypting said transform comprises dividing said transform of said generating function by said Fourier transform of said signal bearing information from a body part.

6. The method of claim 2 wherein said step of obtaining a biometric information signal comprises:

obtaining a coherent optical beam modulated with a biometric image of a body part; and obtaining a beam carrying an optical Fourier transform of said biometric image.

7. The method of claim 6 wherein said step of decrypting said previously encrypted transform further comprises the steps of:

addressing a full-complex spatial light modulator (SLM) with said encrypted transform; and illuminating said SLM with said beam carrying the Fourier transform of the biometric image to obtain an output beam;

wherein the step of undertaking an inverse transform operation on said decrypted transformed generating function comprises obtaining an optical transform of said output beam; and wherein the step of obtaining parameters from said inverse transformed decrypted generating function to obtain a PIN comprises the steps of:

registering an intensity distribution of said transformed output beam; and retrieving said PIN from said intensity distribution.

8. The method of claim 5 wherein said step of writing the encrypted PIN into storage means further comprises:

recording a hologram, a complex amplitude of a spatial grating of said hologram being proportional to said encrypted PIN; and attaching said hologram to storage means.

9. The method of claim 8 wherein said step of recording a hologram further comprises the steps of:

determining a complex conjugate of said encrypted PIN;

determining an inverse Fourier transform of said complex conjugate to obtain an inverse transformed addressing signal;

addressing a full-complex SLM with said inverse transformed addressing signal;

illuminating said SLM with coherent light to produce an object beam;

obtaining an optical Fourier transform of said object beam; and recording a reflective hologram by means of interference of said object beam with a reference beam which is coherent with said object beam.

10. The method of claim 6 wherein said step of decrypting said transform of said generating function further comprises the step of illuminating a prerecorded hologram with said beam carrying the Fourier transform of the biometric image;

wherein the step of undertaking an inverse transform operation on said decrypted transformed generating function comprises obtaining an optical transform of a beam diffracted from said hologram;

and wherein the step of obtaining parameters from said inverse transformed decrypted generating function to obtain a PIN comprises:

registering an intensity distribution of said transformed diffracted beam; and calculating scalar products of said intensity distribution and each of a plurality of basis functions to obtain a PIN, said basis functions being the same as they were during encryption.

11. The method of claim 1 wherein said step of obtaining a biometric information signal comprises:

obtaining a coherent optical beam modulated with a biometric image of a body part; and registering an intensity distribution of a Fourier spectrum of said biometric image.

12. The method of claim 11 including the steps of:

(a) processing said intensity distribution of the Fourier spectrum of the biometric image; and (b) deriving a cipher function from said processed intensity distribution;

wherein the step of obtaining a generating function comprises obtaining a generating function such that said random characters are coefficients in an expansion of square of said generating function over basis functions;

wherein said step of obtaining a transform of said generating function comprises obtaining a first transform of said generating function such that the first transform has an inverse transform which exists and can be obtained optically and spatial frequencies which overlap with spatial frequencies of said Fourier spectrum of said biometric image;

and wherein the step of encrypting said transform of said generating function comprises the steps of:

(i) obtaining a product of said first transform of the generating function and a complex exponent of said cipher function; and (ii) obtaining a second transform of said product such that said second transform has an inverse transform which exists and can be performed optically.

13. The method of claim 12 wherein step (a) comprises:

mapping said intensity distribution of the Fourier spectrum of the biometric image with a saturation function;

further processing said intensity distribution with a randomizing operator; and obtaining a Gabor transform of said processed intensity distribution.

14. The method of claim 12 wherein step (b) comprises binarization or quantization of said processed intensity distribution to derive a cipher function.

15. The method of claim 4 wherein said step of obtaining a biometric information signal comprises:

obtaining a coherent optical beam modulated with a biometric image of a body part; and registering an intensity distribution of Fourier spectrum of said biometric image.

16. The method of claim 15 including the steps of:

(a) processing said intensity distribution of the Fourier spectrum of the biometric image;

(b) deriving a cipher function from said processed intensity distribution;

wherein the step of decrypting said previously encrypted transform of said generating function comprises the steps of:

(c) addressing a first full-complex SLM with said encrypted transform;

(d) addressing a second phase-only SLM with the sign-inversed cipher function;

(e) illuminating said first SLM with a coherent light beam to obtain a beam modulated with said encrypted transform;

(f) obtaining an optical transform of said modulation beam such that said transform is inverse to a second transform which was performed during encryption;

(g) illuminating said second SLM with said optically transformed beam to obtain an output beam;

wherein the step of undertaking an inverse transform operation comprises;

(h) obtaining an optical transform of said output beam such that said transform is inverse to a first transform which was performed during encryption;

and wherein the step of obtaining parameters from said inverse transformed decrypted generating function to obtain a PIN comprises the steps of:

(i) registering an intensity distribution of said transformed output beam; and (j) calculating scalar products of said intensity distribution and each of a plurality of basis functions to obtain a PIN, said basis functions being the same as basis functions used during encryption.

17. The method of claim 16 wherein step (a) comprises:

mapping said intensity distribution of the Fourier spectrum of the biometric image with a saturation function;

further processing said intensity distribution with a randomizing operator; and obtaining a Gabor transform of said processed intensity distribution.

18. The method of claim 16 wherein step (b) comprises binarization or quantization of said processed intensity distribution to derive a cipher function.

19. The method of claim 12 wherein said step of writing the encrypted PIN into storage means further comprises:

recording a hologram, a complex amplitude of a spatial grating of said hologram being proportional to said encrypted PIN; and attaching said hologram to storage means.

20. The method of claim 19 wherein said recording a hologram comprises the steps of:

addressing a first amplitude-only SLM with said generating function;

addressing a second phase-only SLM with said cipher function;

illuminating said first SLM with a coherent light beam to obtain a beam modulated with said generating function;

obtaining a first optical transform of said modulated beam;

illuminating said second SLM with said optically transformed beam to obtain an object beam;

obtaining a second optical transform of said beam; and recording a reflective hologram by means of interference of said transformed object beam with a reference beam which is coherent with said object beam.

21. The method of claim 15 wherein said step of decrypting said transform of said generating function further comprises the steps of:

addressing a phase-only SLM with the sign-inversed cipher function;

illuminating a pre-recorded hologram with a coherent light beam;

obtaining an optical transform of a beam diffracted from said hologram such that said transform is inverse to a second complex-conjugated transform which was performed during encryption;

illuminating said SLM with said transformed diffracted beam to obtain an output beam;

wherein the step of undertaking an inverse transform operation on said decrypted transformed generating function comprising obtaining an optical transform of said output beam such that said transform is inverse to the first complex conjugated transform which was performed during encryption;

and wherein the step of obtaining parameters from said inverse transformed decrypted generating function to obtain a PIN comprises:

registering an intensity distribution of said transformed output beam; and calculating scalar products of said intensity distribution and each of a plurality of basis functions to obtain a PIN, said basis functions being the same as they were during encryption.

22. The method of claim 11 including the steps of:

encrypting information with a key which is a function of said PIN; and storing said encrypted information on said storage means; and wherein said encrypting a transform of said generating function step further comprises the steps of:

(a) processing said intensity distribution of the Fourier spectrum of the biometric image;

(b) deriving a unique vector from said processed intensity distribution; and (c) encrypting said transform of said generating function with a symmetric algorithm, said unique vector being a key to said algorithm.

23. The method of claim 22 wherein step (a) comprises mapping said intensity distribution of the Fourier spectrum of the biometric image with a saturation function.

24. The method of claim 23 wherein step (a) further comprises obtaining Gabor transform of said processed intensity distribution.

25. The method of claim 22 wherein step (b) comprises the steps of:

selecting a pre-determined number of highest peaks in said processed intensity distribution to generate a selected peaks array;

transforming said selected peaks array to a polar co-ordinate system, the centre of which corresponds to the zeroth spatial frequency of said Fourier spectrum, to generate a polar co-ordinates array, each element in said polar co-ordinates array being represented by a vector comprising polar co-ordinates and a peak amplitude; and deriving said unique vector from said polar co-ordinates array such that the number of elements in said unique vector are equal to a dimension of a key required by said symmetric algorithm.

26. The method of claim 22 wherein step (b) comprises the steps of:

transforming said processed intensity distribution to a polar co-ordinates system, the centre of which corresponds to the zeroth spatial frequency of said Fourier spectrum, to generate a polar co-ordinates distribution;

calculating a pre-determined number of first coefficients in an expansion of said polar co-ordinates distribution over spherical harmonics;

calculating a square of absolute value of each said coefficient, and normalizing said squares to obtain a normalized array; and deriving said unique vector from said normalized array such that the number of elements in said unique vector are equal to a dimension of a key required by said symmetric algorithm.

27. Apparatus for encrypting a PIN, comprising:

means for obtaining a biometric information signal bearing characteristics of a body part;

means for generating a sequence of random characters to obtain a PIN;

means for obtaining a generating function comprising said random characters as parameters;

means for obtaining a transform of said generating function;

means for encrypting said transform of said generating function with said biometric information signal to obtain an encrypted PIN; and means for writing said encrypted PIN into a store.

28. Apparatus for decrypting a PIN, comprising:

means for obtaining a biometric information signal bearing characteristics of a body part;

means for reviewing from storage a transform of a generating function, said generating function having characters of a PIN as parameters, said transform of said generating function previously encrypted with said biometric information signal;

means for decrypting said previously encrypted transform of said generating function, said biometric information signal being a key to said encrypted transform;

means for undertaking an inverse transform operation on said decrypted transform to obtain an inverse transformed decrypted generating function; and means for obtaining parameters from said inverse transformed decrypted generating function to obtain a PIN.

29. The method of claim 5 wherein the step of obtaining a generating function comprises obtaining a plurality of orthogonal basis functions, said characters being parameters of said basis functions.

30. The method of claim 5 wherein the step of obtaining a generating function comprises obtaining a generating function such that said random characters are coefficients in an expansion of square of said generating function over basis functions.

31. The method of claim 7 wherein the step of retrieving said PIN from said intensity distribution comprises calculating scalar products of said intensity distribution and each of a plurality of basis function to obtain a PIN, said basis functions being the same as basis functions used during encryption of said encrypted PIN.

* * * * *

UNITED STATES PATENT AND TRADEMARK OFFICE
CERTIFICATE OF CORRECTION

PATENT NO. : 5,712,912
DATED : January 27, 1998
INVENTOR(S) : TOMKO, George J., et al.

It is certified that error appears in the above-identified patent and that said Letters Patent are hereby corrected as shown below:

Claim 21, column 14, line 56, cancel "comprising" and insert --comprises--;

Claim 28, column 16, line 23, cancel "reviewing" and insert --retrieving--.

Signed and Sealed this

Second Day of June, 1998

Attest:

BRUCE LEHMAN

Attesting Officer

Commissioner of Patents and Trademarks